United States Patent
Cerra et al.

[11] 4,106,016
[45] Aug. 8, 1978

[54] DEVICES FOR DETERMINING ERRORS OF SITING, ESPECIALLY IN RADAR SYSTEMS

[76] Inventors: Raffaele Cerra, Via S. Domenico a Corso Europa, 29; Michele Scherillo, Via Massimo Stanzione, 18, both of 80100 - Naples, Italy

[21] Appl. No.: 709,803

[22] Filed: Jul. 29, 1976

[30] Foreign Application Priority Data

Jul. 30, 1975 [IT] Italy ............................... 50719 A/75

[51] Int. Cl.$^2$ ............................................... G01S 7/02
[52] U.S. Cl. .................................................... 343/7.4
[58] Field of Search ................................. 343/17.7, 7.4

[56] References Cited
U.S. PATENT DOCUMENTS 2,566,331 9/1951 Huber et al. ........................... 343/7.4
2,708,257 5/1955 Bedford ............................. 343/7.4 X

*Primary Examiner*—T.H. Tubbesing

[57] ABSTRACT

A device for determining tracking errors in radar systems and the like through correlation between the radar echo signal and a signal related to the rotation of the antenna, using means for narrow band filtering and phase comparison, and amplifying means and means for AC-DC conversion and DC amplifying means in which the narrow band filtering means and phase comparison means carry out their functions through the alternate cyclical switching of the signal from one condenser to another synchronous with the movement of the antenna, and with a similar switching carrier out in other condensers in the stage formed by the AC-DC conversion means.

7 Claims, 3 Drawing Figures

DEVICES FOR DETERMINING ERRORS OF SITING, ESPECIALLY IN RADAR SYSTEMS

The present invention concerns an improvement in apparatus determining tracking errors in radar systems. In particular, the invention concerns a device which, through correlation between the radar echo signal and a signal synchronous with the rotation of the antenna, indicates the azimuth and elevation errors relative to tracking. As is known, a knowledge of these errors is essential in order to correct the position of the tracking system moment by moment. If tracking errors are present, the radar echo signal will have a modulation with a frequency equal to the frequency of rotation of the antenna.

In reality this modulation of the radar echo signal can result not only from the rotation of the beam of the antenna, but can also result from other inputs such as an internal scanning system which uses a monopulse antenna. From now on, however, for the sake of brevity, we shall only refer to the rotation of the antenna.

The determination of tracking errors is accomplished by obtaining the vector component representative of the echo signal modulation and the vector component representative of the noise signal in the direction of the vector representative of the movement of the radar antenna.

In dealing with this problem in the past, there have been used electronic devices in which the input signal, based on the radar echo, is first filtered by means of a narrow band filter in order to improve the signal to noise ratio; then it is AC amplified, and then sent to a coherer, which resolves the component according to the vector representative of the movement of the antenna. Finally the signal is amplified by means of a DC amplifier. AC amplification is aimed at reducing the effect of the drift from DC amplification on the outgoing signal of the circuit.

The prior art solution has various disadvantages which limit performance and make it almost impossible to apply in the case of a particularly low ratio of signal to noise.

One disadvantage is due to the fact that the inevitable instability of amplitude and phase of the narrow band filter which results in errors in the output signal of the circuit; in particular, phase slipping introduced by the above-mentioned filter results in unacceptable alterations in the value of the component of the input signal according to the reference signal which, as has been stated, is representative of the rotation of the antenna.

A further disadvantage of the prior art is due to the fact that, once the narrow band filter is installed with a fixed central frequency, it is not possible to change the frequency of the input signal which must coincide exactly with that of the filter.

This disadvantage may be reduced by using a wide band filter instead of a narrow band filter; in this case, however, the AC amplifier must be designed to take the peaks of noise into account. This may result in particularly serious complications in case the values of the ratio of signal to noise is low, especially since it then becomes necessary to maintain the gain of the AC amplifier at high levels in order to reduce the effect of the drift of the DC stage.

These disadvantages and others were eliminated through the improvements which are the object of the present invention.

The principle object of the present invention is to provide a device for determining tracking errors, particularly in radar systems, which is able to operate with input signals at not necessarily fixed frequencies, even when the background noise is at high levels, thereby reducing the phase slipping and fluctuations in amplitude that are associated the operation of narrow band filtering.

The device of the present invention provides a DC voltage proportional to the modulation amplitude of the radar echo signal and to the cosine of the phase angle between this input signal and the synchronous signal related to the motion of the radar antenna, thus combining in a single circuit block the two functions of narrow band filtering with high stability and phase comparison between the input signal and the synchronous signal.

Among other things, this device allows for the reduction in cost due to the circuit simplification which results from having the two afore-mentioned functions combined in a single block.

Another important advantage concerning the present invention resides in the elimination of the necessity of calibration operations. Essentially this advantage results from the fact that, in the present invention, the central frequency of the narrow band filter does not depend on the value of resistor, inductor, or capacitor components, but only on the frequency of the synchronous signal.

Therefore, the specific object of the present invention is to provide a device for determining errors of tracking, particularly in radar systems, obtained through the correlation between the radar echo signal and a signal synchronous with the rotation of the antenna, characterized by the fact of including narrow band filtering means and phase comparison means; AC amplifying means; means for AC-DC conversion; and DC amplifying means in which the above-mentioned narrow band filtering means and phase comparison means carry out these functions through the alternative cyclical switching of the signal from one condenser to another in timed relation with the movement of the antenna and with a similar switching carried out upon another pair of condensers in the stage formed by the above-mentioned AC-DC conversion means.

Since the input signal and the signal representing the rotation of the antenna have, as has been previously stated, exactly the same frequency at steady condition, one of the two condensers of the filtering and phase comparison stage result in being charged at a voltage equal to the mean value of the input signal calculated for a half cycle of the synchronous signal, which the other condenser will be charged at a voltage equal and opposite with respect to the first.

This mean voltage to which the two condensers are charged is a function of the relative phase between the input signal and the synchronous signal, thus permitting the desired phase comparison to be carried out between the two signals.

As has been stated, the same two condensers, with the relative system of switching of the signal, also carry out the narrow band filtering of the signal itself, as can be understood from the observation that for the input signals having frequencies equal to the frequency of the synchronous signal, the two condensers are stably charged at a voltage equal to the mean value of the input signal in a half cycle, thus not producing any attenuation of the above-mentioned signal. With input signals with a different frequency, there will be observed a continuous phase slipping which produces variations in the phase differences at the ends of the condensers at the expense of the input signal which is then attenuated.

The voltages to which the two condensers of the phase indicator become charged, which, as has been previously stated, are equal and opposite, are applied, alternatively, and in phase with the synchronous signal, through a conventional AC amplifier to each of the two condensers included in the stage of DC conversion; therefore one of these condensers is charged to the positive voltage and the other to negative voltage, said voltages being equal but of opposite potential.

The choice of the condenser which receives the positive voltage is determined by the phase between the synchronous signal and the alternative application of the signal to the two condensers; in fact, the condenser which is connected during the half cycle of synchronism in which the signal is positive will be charged positively. Obviously, the other condenser will be charged with a negative value.

The two opposite voltages present on the two condensers are applied to the two terminals of a differential proportional amplifier which computes the algebraic difference and which therefore results in being equal in value to the double of the value of the two voltages applied at the input.

The sign, plus or minus, as has been noted previously, depends on the phase relation, and fixed conventionally between the synchronism and the application of the signal to the two condensers of the stage of AC-DC conversion.

The present invention will now be described in greater detail in its preferred form with reference to the enclosed drawings wherein.

Figure 1:
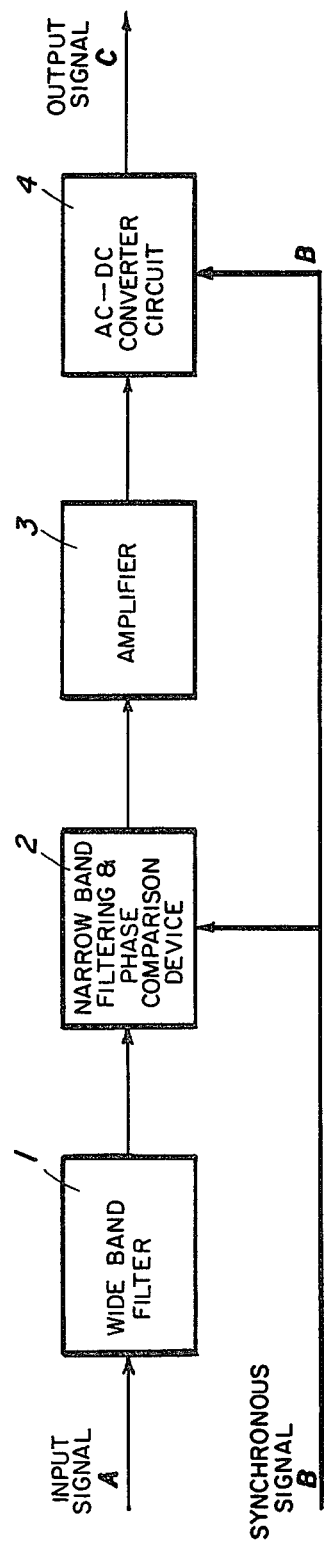
FIG. 1 represents a block diagram of one form of the device according to the invention.

With reference to FIG. 1, one can see how the input signal present at point A is first filtered by the wide band filter 1 and then sent to the narrow band filtering and phase comparison device 2 to which is added simultaneously through B, the synchronous oscillation. The signal, amplified by the stage of AC amplification 3, is then applied to the AC-DC conversion circuit 4 which, also receiving the synchronous signal through B, furnishes at the output C desired information in the form of the level of direct voltage.

Figure 2:
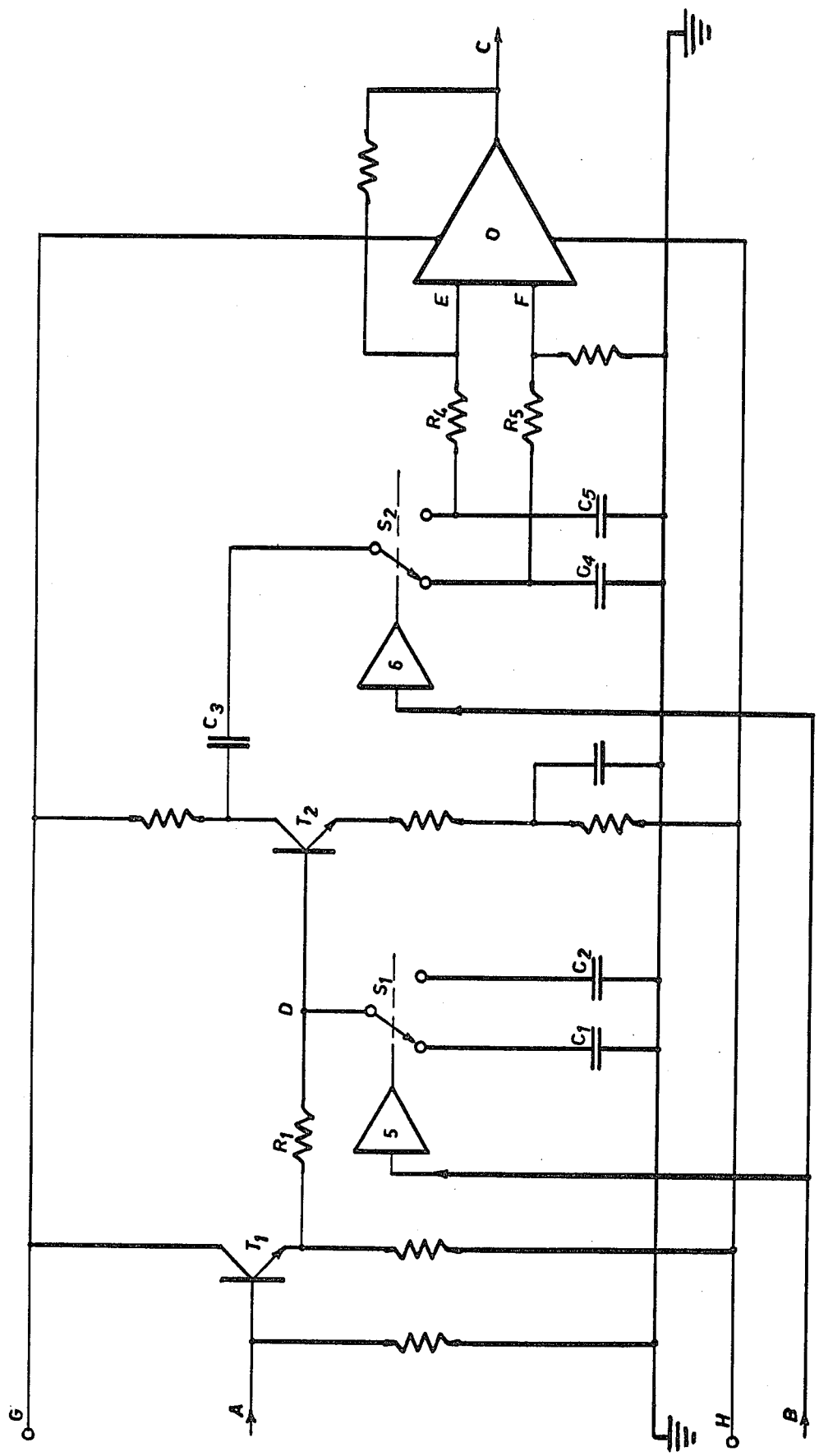
FIG. 2 represents a wiring diagram of the same device.

Wiring diagram (FIG. 2) shows how the input signal present in point A and coming from a conventional wide band filter through transistor $T_1$ connected as an emitter-collector for the purpose of lowering the impedance, is alternatively applied through the resistor $R_1$ and the switching device $S_1$, to the condensers $C_1$ and $C_2$. Each of these condensers is alternatively connected (always through $S_1$), to the input of a conventional stage of AC amplification stage made up essentially of the transistor $T_2$. The output of this stage, across the condenser $C_3$ and the switching device $S_2$ is applied alternatively to the two condensers $C_4$ and $C_5$, which are respectively connected through the resistors $R_4$ and $R_5$ to the input with inversion E, and to the direct input F of a differential operational amplifier O. The differential operational amplifier O is of a conventional type and can be carried out either with integrated technique or not.

The switching devices $S_1$ and $S_2$, are made up preferably of semi-conductor circuits of the driver-gate type, as for example the type DG 190, and are controlled simultaneously by the synchronous signal coming from point B.

Figure 3:
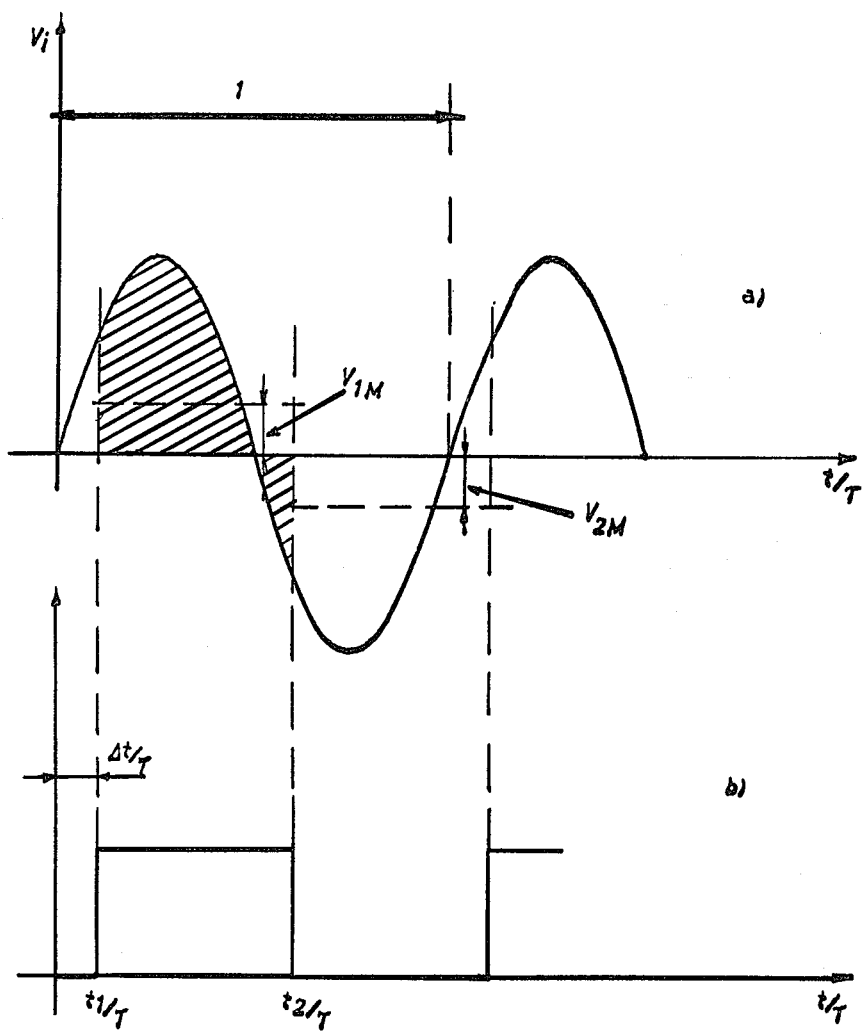
FIG. 3 is a graph which shows the levels of the voltages to which the two condensers of the filtering stage and phase comparison stage are charged.

The two conductors G and H carry the respective positive and negative feeder voltages. FIG. 3 shows at the incoming signal and the mean values $V_{1M}$ and $V_{2M}$ of the voltage during the half cycle of the synchronous signal are emphasized: these values depend on the phase displacement $\Delta T$ between the incoming signal and the synchronous signal.

FIG. 3a shows the sinusoidal input signal and FIG. 3b shows the synchronous timed signal. The synchronous signal drives switching device $S_1$ to connect to capacitor $C_1$ during the time interval between $t_{1/T}$ and $t_{2/T}$. After time $t_{2/T}$, switching device $S_1$ will be driven to connect to capacitor $C_2$, for an equal time period.

Thus, during the time interval $t_{1/T}$-$t_{2/T}$, the capacitor $C_1$ will be charged by the voltage of the sinusoidal input signal. It will be charged at the average value $V_{1M}$ given by:

$$V_{1M} = \frac{1}{T} \int_{t_1}^{t_2} Vi\, dt = \int_{t_{2/T}}^{t_{1/T}} Vi\, dt$$

Graphically, the average value $V_{1M}$ is represented by the hatched areas, considered positive above the abscissa base line and negative below the abscissa base line.

In the time interval up to $t_{2/T}$, the capacitor $C_1$ will remain charged to the value of $V_{1M}$ and the capacitor $C_2$ in like manner will be charged to a value:

$$V_{2M} = -V_{1M}$$

The absolute value of the charge of the two capacitors $C_1$ and $C_2$ will depend upon the phase displacement $\Delta_{t/T}$ between the input signal and the synchronous signal. It can be seen that if $\Delta_{t/T} = \frac{1}{4}$, the absolute value of the charge on the capacitors will be equal to zero.

The present invention has been described with particular reference to one of its illustrative forms but is not restrictive. It is evident that certain modifications and substitutions can be made without going beyond the protection of the present industrial patent.

We claim:

1. A device for determining aim errors in radar systems through correlation between the radar echo signal and a signal synchronous with the rotation of the antenna comprising, a first wide-band filtering means which receives the radar echo input signal, a second means for filtering and phase comparison driven by the antenna rotation signal and being connected in series with said first filtering means and providing a narrow band filtering of said input signal for eliminating noise components whose frequency is different from that of the antenna rotation signal, and for providing phase comparison between said input signal and said antenna rotation signal, and for generating an output signal that is correlated to the phase difference between said input signal and said antenna rotation signal, an AC amplifier means connected to said second means for amplifying the output signal, an AC-DC converter means connected to said AC amplifier means for converting the amplified output signal into two voltage levels having the same value and opposite signs, and a differential amplifier connected to said AC-DC converter for receiving the two voltage level signals and transmitting an amplified error signal.

2. A device as claimed in claim 1 wherein said second means for filtering and phase comparison comprises, an impedance adapter for receiving said input signal, a first switching device connected to said impedance adapter and driven by the antenna rotation signal for cyclically switching the signal, and a pair of capacitors connected to said first switching device for respectively receiving the cyclically switched signals therefrom.

3. A device as claimed in claim 2 wherein said AC-DC converter means comprises, a second switching device driven by the antenna rotation signal for cyclically switching the amplified output signal, a second pair of capacitors connected to said cyclically switched amplified output signal, and coupling resistors interconnecting said second pair of capacitors and said differential amplifier.

4. A device as claimed in claim 3 wherein said first and said second switching devices comprise semi-conductor circuits of the driver-gate type.

5. A device as claimed in claim 2 wherein said impedance adapter comprises a transistor connected as an emitter follower.

6. A device as claimed in claim 1 wherein said AC amplifier means comprises a single stage of amplification embodying a transistor.

7. A device as claimed in claim 1 wherein said differential amplifier comprises an integrated operational amplifier.

* * * * *